Dec. 23, 1958     H. A. MEAD ET AL     2,865,448
MACHINE FOR AUTOMATICALLY CUTTING ADJUSTABLY PREDETERMINED
LENGTHS FROM ROLL MATERIAL
Filed April 11, 1955     3 Sheets-Sheet 1

INVENTORS
Harry A. Mead
Lambert L. Slagel
BY
ATTORNEY

Dec. 23, 1958     H. A. MEAD ET AL     2,865,448
MACHINE FOR AUTOMATICALLY CUTTING ADJUSTABLY PREDETERMINED
LENGTHS FROM ROLL MATERIAL
Filed April 11, 1955     3 Sheets-Sheet 2

INVENTORS
Harry A. Mead
BY Lambert L. Slagel

ATTORNEY

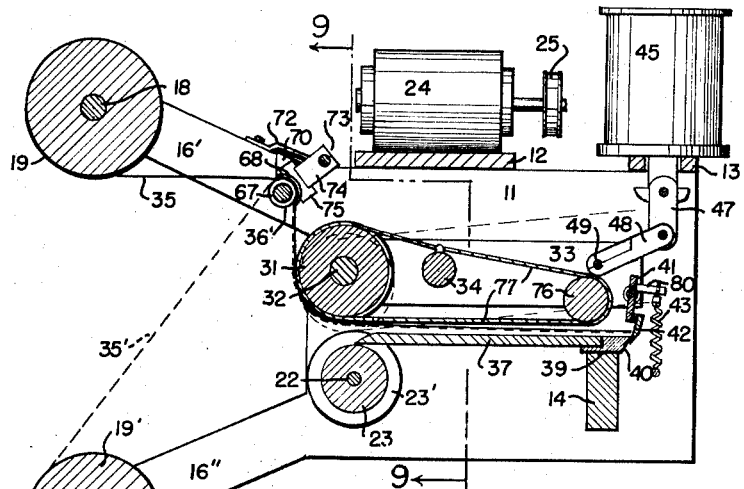

United States Patent Office 2,865,448
Patented Dec. 23, 1958

2,865,448

MACHINE FOR AUTOMATICALLY CUTTING ADJUSTABLY PREDETERMINED LENGTHS FROM ROLL MATERIAL

Harry A. Mead, Jefferson County, near Denver, and Lambert Lamont Slagel, Denver, Colo.

Application April 11, 1955, Serial No. 500,605

12 Claims. (Cl. 164—39)

This invention relates to means for the continuous and automatic division of long sheets or strips of flexible materials into sections of uniform length, and has as an object to provide a novel and improved apparatus unit operable with precision and efficiency to successively and repetitiously sever uniform lengths from a roll supply of flexible sheet material.

A further object of the invention is to provide a machine for cutting predetermined lengths from rolls of flexible sheet material that is characterized by means selectively and adjustably actuable while the machine is in operation or at rest to regulate and to determine the longitudinal extent of the cut lengths produced by the machine.

A further object of the invention is to provide a machine for cutting predetermined lengths from rolls of flexible sheet material that is characterized by novel means for effecting regularly intermittent advance of the material in synchronous correlation with the action of a cutter.

A further object of the invention is to provide a machine for cutting predetermined lengths from rolls of flexible sheet material that is characterized by adaptation of a regularly continuous drive through the agency of an intermittently actuable cutter to effect regularly intermittent advance of the material relative to the cutter.

A further object of the invention is to provide a machine for cutting predetermined lengths from rolls of flexible sheet material wherein regularly intermittent actuation of a cutter is automatically applied to synchronously determine intermittent advance of material relative to the cutter in a manner to apply the cutter to the material when the latter is at rest.

A further object of the invention is to provide a machine for cutting adjustably predetermined lengths from superposed layers of flexible sheet materials simultaneously and intermittently advanced through the machine from separate rolls in automatic reaction to machine operation.

A further object of the invention is to provide a machine for cutting adjustably predetermined lengths from single or superposed multiple webs of flexible sheet material that is adjustably operable to slit and longitudinally divide such material as an incident of its advance through the machine.

A further object of the invention is to provide a novel and improved construction and arrangement of elements constituting an intermittently actuable cutter effective to sever sections from rolls of flexible sheet material.

A further object of the invention is to provide a novel and improved machine for cutting adjustably predetermined lengths from rolls of flexible sheet material that is fully automatic in continuous efficient operation, that is adjustably applicable to simultaneously longitudinally divide the material, that is simple and relatively inexpensive of production, installation, and practical use, that is susceptible of construction in a wide range of sizes and capacities suited to act upon various flexible materials of diverse widths and superposed combinations, that is repetitiously operable with precision of result, that is durable and rugged in use, speedy in action, positive in performance, and free from onerous servicing and maintenance requirements.

With the foregoing and other objects in view, our invention consists in the construction, arrangement, and operative combination of elements as hereinafter set forth, pointed out in our claims, and illustrated by the accompanying drawings, in which—

Figure 8 is a section similar to Figure 3 longitudinally through a modified organization of the unit adapted to act upon multiple layers of flexible sheet material and to longitudinally divide the material fed to and through the unit.

Figure 9 is a transverse section taken substantially on the indicated line 9—9 of Figure 8.

Figure 10 is a fragmentary, detail section, on a relatively enlarged scale, through the cutter blade and related elements of the organization according to Figure 8.

Figure 11 is a fragmentary, detail section, on the same scale as Figure 10, through web-slitting means and related elements of the organization according to Figure 8.

Figure 12 is a top plan view of the features of the organization shown in Figure 11, an intermediate portion of the view being broken away to conserve space.

Figure 13 is a fragmentary, detail section, on a further enlarged scale, taken substantially on the indicated line 13—13 of Figure 10.

Figure 1:
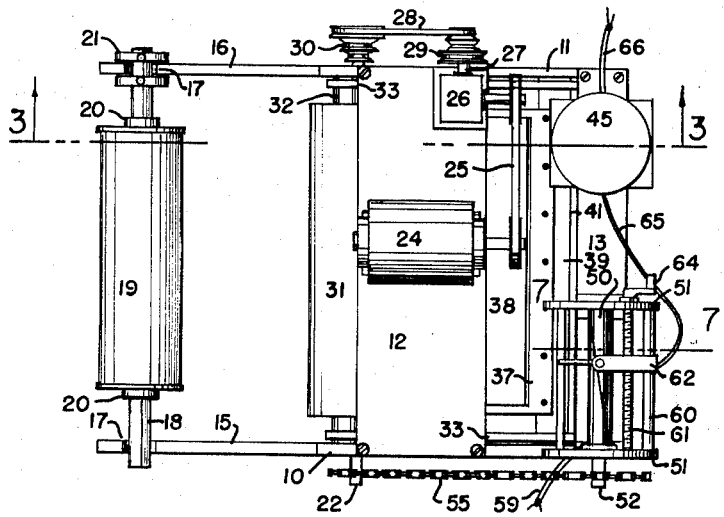
Figure 1 is a top plan view of a typical machine unit embodying the principles of the invention as assembled ready for practical use with a roll of flexible sheet material mounted but not engaged with the operating elements of the unit.
Figure 2:
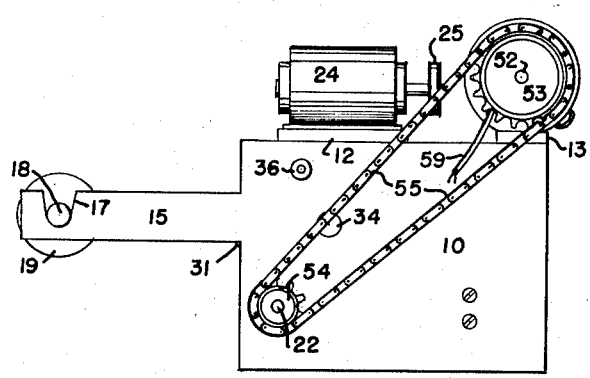
Figure 2 is an elevation of one side of the unit shown by Figure 1.

Incident to many packaging, wrapping, manufacturing, and other operations, the cutting of long, rolled strips of flexible sheet materials, such as paper, sheet plastics, fabrics, and the like, into sections of uniform length and into widths other than that of the original strip is required, and the instant invention is hence directed to the provision of a novel and efficient machine operable on a wide variety of such materials to automatically divide the same, both laterally and longitudinally, with speed and precision into uniform sections whereof the predetermined length and width may be regulated at will and adjusted throughout a considerable range within the capacity of a given machine, all with conservation of time, labor and expense.

As represented by Figures 1–7, inclusive, the cooperating elements distinctively characterizing the novel machine of the invention are mounted in, upon, or associated with a rigid frame, which is shown as comprised from like, rectangular side plates 10 and 11 paired to stand vertical in spaced parallel relation by means of struts 12 and 13 secured at their ends to and spanning in perpendicular relation between upper margins of said plates and a beam 14 perpendicularly bridging between the plates inwardly adjacent a lower corner thereof. As illustrated, the strut 13 is a flat member engaged with and connecting between the upper corners of the plates 10 and 11 upwardly adjacent the location of the beam 14 and the strut 12 is a flat member similar to and wider than the strut 13 spacedly paralleling the latter inwardly adjacent the plate upper corners remote from the location of said beam. Completing the frame structure of the illustrated organization, like, rigid arms 15 and 16 fixedly or integrally outstand in coplanar relation with and from the vertical ends of the plates 10 and 11, respectively, adjacent the strut 12 and somewhat below the plane of the latter in a generally horizontal disposition and spacedly parallel registration laterally of the frame. Upper margins of the arms 15 and 16 are similarly notched adjacent the free ends of the arms, as at 17, to receive and to removably and replaceably support the opposite ends of an arbor 18 thereby mounted in parallel relation with the beam 14, which arbor is provided for the rotatable support of a roll 19 of the material to be sectioned by the machine. The arbor 18 is furnished with any preferred construction and arrangement of means 20 effective to detachably secure the roll 19 against displacement axially thereof and to so engage rolls 19 of different lengths with the arbor, and any appropriate construction of means 21 may be associated with the arbor to inhibit axial shift thereof relative to its seat in the notches 17. Thus provision is made for mounting a roll of flexible sheet or strip material in position to be sectioned by the machine as hereinafter set forth and for unwinding of its web in reaction to tensions applied to the latter, which mounting accommodates rolls of diverse axial lengths and facilities interchange and resupply of the rolls.

Fixed on a shaft 22 journaled for rotation in, through, and bridging between the plates 10 and 11, a cylindrical feed roller 23 is disposed in spaced parallelism with and between the beam 14 and arbor 18 below the horizontal plane of the latter, and the periphery of said roller 23 preferably is worked to the form of a spaced succession of like annular ribs 23' formed of or circumferentially surfaced with gripping or adherescent material, such as rubber, having a high coefficient of friction. Continuous, uniform drive of the feed roller 23 is effected by means of an electric motor 24 carried by the strut 12 in driving relation, as through a belt 25, with a speed reducer 26 mounted upon an end of said strut with its power output shaft 27 projecting beyond the side plate 11 in spaced parallelism with the corresponding end of the shaft 22 and in driving relation with the end of said shaft 22 projecting exteriorly of the side plate 11 through the agency of a belt 28 engaged with and about graduated pulley sets 29 and 30 fixed, respectively, to said shafts 27 and 22. Thus, operation of the motor is applied through the belt 25, reducer 26, pulley sets 29 and 30, and belt 28 to rotate the roller 23 about its axis and for travel of its upper arc in a direction away from the roll 19 at a uniform speed determined by the speed ratio of the reducer 26 and that of the pulley set elements engaged by the belt 28.

Complementary to and for intermittent coaction with the feed roller 23, a smooth-surfaced roller 31 is mounted for free rotation about an axis 32 engaged in spaced parallel relation with and above the shaft 22 at one end of and to span between the spacedly parallel side bars 33 of a yoke accommodated within the rigid main frame of the machine. The side bars 33 of the yoke carrying the roller 31 are disposed inwardly adjacent and parallel to the frame side plates 10 and 11 below and generally parallel to the upper margins of said plates, and are engaged on and for oscillation in a vertical plane about a shaft or axis 34 therethrough and secured at its ends in the side plates 10 and 11 inwardly adjacent and in spaced parallelism with the axis 32, thus to permit rocking of the roller 31 between peripheral engagement with and separation from the feed roller 23 in reaction to oscillation of the yoke side bars 33 on their mounting axis 34. As is clearly shown in Figure 3, the axis 32 of the roller 31 is expediently offset slightly toward the position of the roll 19 from the vertical plane through the axis of the shaft 22, thus to establish the point of tangency between the rollers 23 and 31 slightly below, and trailing in the direction of roller 23 rotation from, the high point of the roller 23. The web 35 of material from the roll 19 is engaged between the rollers 23 and 31 to be fed and advanced through the machine with unwinding effect upon the roll in reaction to the continuous, uniform rotation of the roller 23 when the yoke carrying the roller 31 is rocked to lower said roller 31 toward and sufficiently to press the said web against the adherescent surface of the roller 23; elevation of the roller 31 away from the roller 23 operating to nullify the web-feeding pressure with consequent interruption of web feed due to the then-minimized grip of the constantly-rotating adherescent surface of the roller 23 against the web. Tensioning of the web 35 in a correlation with the roller 31 effective to accomplish the intermittent web drive characteristic of the apparatus is the function of a freely-rotatable idler roller 36 spacedly paralleling and above said roller 31 in journaled relation with and between the side plates 10 and 11 and inwardly from the adjacent vertical margins of the latter to register vertically between the axes 32 and 34. The web 35 is led from the roll 19 over and downwardly about the idler roller 36 to then extend over and about the arc of the roller 31 adjacently opposed to the roll 19 and in a final reversal of direction between the rollers 23 and 31, as is clearly shown in Figure 3, whereby to wrap a moderately tensioned bight of said web over and against an approximate half circumference of the roller 31 opposed to the roll 19 and for consequent oscillation with said roller 31 toward and away from the roller 23.

Figure 6:
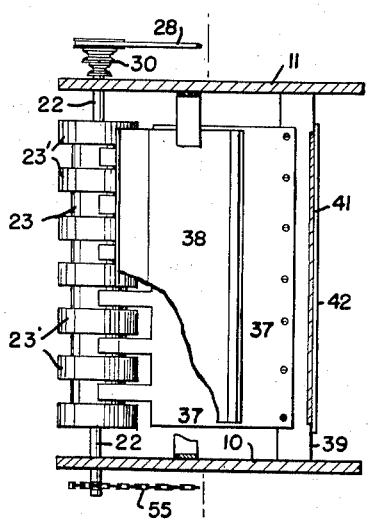
Figure 6 is a transverse section taken substantially on the indicated line 6—6 of Figure 5.
Figure 7:
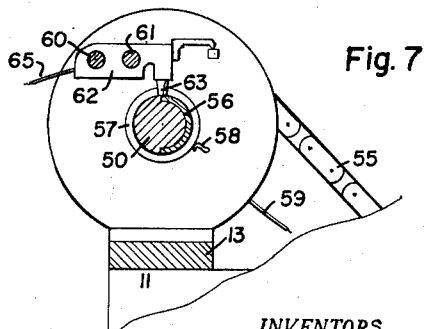
Figure 7 is a fragmentary, detail section, on a relatively enlarged scale, taken substantially on the indicated line 7—7 of Figure 1.

The portion of the web 35 advanced by and between the rollers 23 and 31 is slidably received upon and supported by a fixed bed 37 horizontally disposed between the side plates 10 and 11 at a level approximately tangent to the upper arc of the grooves separating the annular ribs 23' of the rollers 23, the margin of said bed 37 adjacent said roller expediently being notched for the accommodation of said ribs 23' and to inhibit engagement of the web 35 thereunder, as is represented by Figure 6. A guard 38 is suitably fixed in the main frame of the machine to spacedly overlie the upper surface of the bed 37 and therewith define a narrow throat within and through which the web 35 is confined and directed during its travel across the bed. The margin of the bed 37 remote from the roller 23 is secured to and in upper surface coplanar relation with a shear bar 39 supported on the upper edge of the beam 14 in perpendicular relation with and between the side plates 10 and 11, and the edge margin of said bar remote from the bed 37 is inclined inwardly and downwardly to define a shearing lip 40 at and along the upper outer corner of the bar in a disposition slightly overhanging the adjacent vertical face of the beam 14. Thus, as the web 35 is fed through the machine in the manner and by the means above described it is advanced over and across the bed 37 and the bar 39 to extend over and beyond the lip 40 in position to be cut at the line of said lip.

The side bars 33 of the yoke mounting the roller 31 extend at their ends remote from said roller spacedly above and slightly beyond the ends of the bar 39 and pivotally support in spanning relation therebetween a shear plate 41 disposed to rock on an axis above and parallel to the lip 40 through small angular deviations from the vertical effective to incline the said plate 41 inwardly and downwardly toward and into alignment of its lower margin with the lip 40, and a cutter blade 42 is attached, preferably for removal and replacement, to and in downward projection along the said lower margin of the shear plate 41 for severing coaction at times with said lip. Retractile coil springs 43 connecting between upper corners of the shear plate 41 and ears 44 instanding from adjacent margins of the side plates 10 and 11 yieldably urge said plate to maintained sliding engagement of the inner face of the blade 42 with the lip 40, and the free lower edge of said blade, sharpened to function as a slicing cutter, is moderately inclined in a vertical plane transverse of the assembly to effect a progressive shearing, or scissors, action in cooperation with the lip 40 as said blade is moved through oscillation of its mounting yoke downwardly across and slidably against the lip. The correlation of the blade 42 and its inclined lower edge cutter with the lip 40 is such as to elevate the major length of its cutter edge above said lip to open a narrow triangular throat through which the web 35 may be extended when the yoke carrying said blade and the roller 31 is rocked about its axis 34 to press the said roller into engagement with the feed roller 23, as represented by broken lines in Figures 3 and 5, in which relation of the elements the lowermost corner of the blade 42 expediently overlaps the lip 40, and to close the cutter edge of said blade fully along and across said lip 40, with consequent severing effect on the web 35 engaged therebetween, when said yoke is rocked in the opposite direction on its axis and to the separated relationship of the rollers 23 and 31 typified by the full line showings of said Figures 3 and 5. The yoke constituted by the side bars 33 is in such unbalance on its axis 34 as to normally hold the blade 42 in closing relation with and across the lip 40 and the roller 31 elevated away from the roller 23 and to return the yoke and its associated elements to such relationship, with consequent severing of the web 35 at the lip 40 and interruption of web feed across said lip, in reaction to gravity when influences effective to elevate the blade relative to the lip and to engage the roller 31 with the roller 23 through the web 35 have been nullified, thus to interrupt feed of the web 35 when the blade 42 acts to sever the web and to establish feed of the web through the machine only when a path is open for web extension over and beyond the lip 40.

Oscillation of the yoke constituted by the side bars 33 to elevate the end of said yoke carrying the blade 42, and to simultaneously establish feed of the web 35 through the machine, is the function of a solenoid 45 supported with its axis vertical on and adjacent one end of the strut 13 for reciprocation of the solenoid armature 46 in registration with an opening through said strut. The lower end of the armature 46 is connected through any expedient hinge linkage 47 with an end of an arm 48 adjustably secured to and outstanding radially from a member 49 fixed to and between the side bars 33 inwardly adjacent the shear plate 41, so that, when the solenoid is energized, consequent elevation of the armature 46 acts to lift the arm 48 and the associated end of the yoke to rock the latter on its axis 34 and to a degree determined by the adjustment of the cooperating elements, such elevation of the armature functioning to establish feed of the web through the machine and through the opened throat under the blade 42 until the solenoid is deenergized. Upon interruption of current flow to the solenoid 45, the armature 46 drops and the yoke is then rocked as above explained to interrupt the web feed and to simultaneously sever from the web that portion thereof extended beyond the lip 40 as a consequence of the previously-established feed.

Automatic control and adjustable regulation of current flow to the solenoid 45 for corresponding control and regulation of the longitudinal dimension of the lengths cut from the web 35 is a function of the machine accomplished through a revoluble, selectively-adjustable switch organization in constant-driven association with the shaft 22. The switch organization controlling the action of the solenoid is represented as including a cylindrical member 50 of dielectric material mounted for rotation about its axis spacedly parallel to the shaft 22 in and between spacedly parallel brackets 51 fixedly upstanding from the end of the strut 13 remote from the solenoid. An end 52 of the axis supporting the member 50 projects beyond the exterior face plane of the side plate 10 and mounts a sprocket 52 coplanar with a sprocket 54 on the corresponding end of the shaft 22, so that a chain 55 engaged with and extending between said sprockets acts to rotate said member 50 synchronously with and from the continuously driven shaft 22 at any suitable proportional angular velocity determined by the ratio characterizing the sprockets. The member 50 fixedly carries a tapered, tubular sheath 56 of conducting material in surface-flush, partially-enveloping relation therewith, said sheath 56 expediently being of the same length as the said member between the brackets 51, uniformly tapering at its long margins from a base adapted to encircle one end of the member and to a point at the other end of the member, and hence constituting one-half of the surface area of the revoluble member. In any appropriate manner, as by means of a conductor ring 57 on the inner face of one of the brackets 51 in wiping engagement with a conducting contact 58 on the adjacent end of the sheath 56 and a lead 59 of the circuit serving the solenoid 45 connected to said ring 57, the sheath 56 is connected in series with and as a part of the circuit to the solenoid. A slide rod 60 fixedly spans between upper portions of the brackets 51 outwardly from and to parallel the member 50 and a feed screw 61 is journaled for rotation and held against axial shift in said brackets spacedly adjacent and parallel to the rod 60, and a block 62 slidably engages the rod 60 and threadedly engages the screw 61 transversely thereof to overhang the member 50 at one end. The block 62 mounts a contact member 63 substantially radially of and in wiping engagement with the cylindrical surface of the member 50 and sheath 56, and a handle 64 provided at one end of the screw 61 for manual rotation thereof is operable to selectively shift the block 62 and its member 63 in either direction axially of and along the member 50. A lead 65 between the contact member 63 and solenoid 45 couples the switch organization and said solenoid in series in a circuit completed when the lead 59 and a lead 66 from the solenoid are connected with a source or supply of current, whereby to provide for flow of current to and consequent energization of the solenoid whenever the contact member 63 engages the sheath 56 and for interruption of such current flow and consequent deenergization of the solenoid whenever said contact member is in engagement with the non-conducting surface area of the member 50. The switch organization just described functions as the member 50 is steadily rotated by the shaft 22 to alternately lift and release the solenoid armature 46 as the contact 63 alternately wipes over exposed surfaces of the sheath 56 and dielectric member 50, the duration of armature elevation resulting from current flow through the solenoid being determined by the arcuate span of the sheath traversed by the contact 63 and susceptible of regulation through shift of the block 62, by means of the feed screw 61 and handle 64, in the desired direction axially of the member 50, the tapered form of the sheath providing a wide range of such adjustment. The circuit including the solenoid and switch organization may be provided with such relays and other features as may be appropriate to its efficient and desired operation and, together with the circuit serving the motor 24, includes the customary control switch, or switches.

Figure 3:
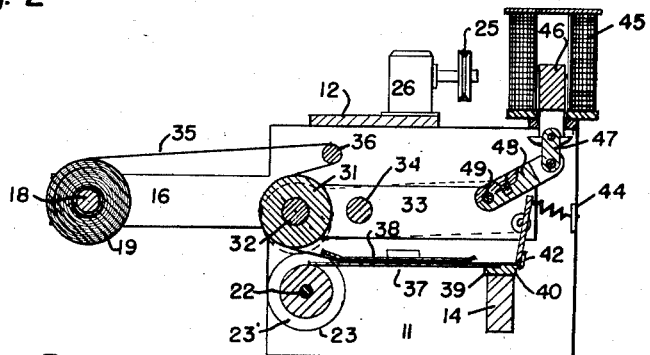
Figure 3 is a section longitudinally through the unit according to Figure 1 taken substantially on the indicated line 3—3 of the latter view and showing a web of the flexible sheet material engaged with the operating elements of the unit.
Figure 4:
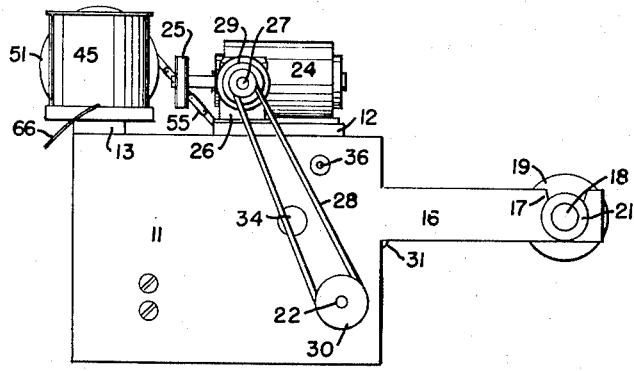
Figure 4 is an elevation of that side of the unit shown by Figure 1 opposite to the showing of Figure 2.
Figure 5:
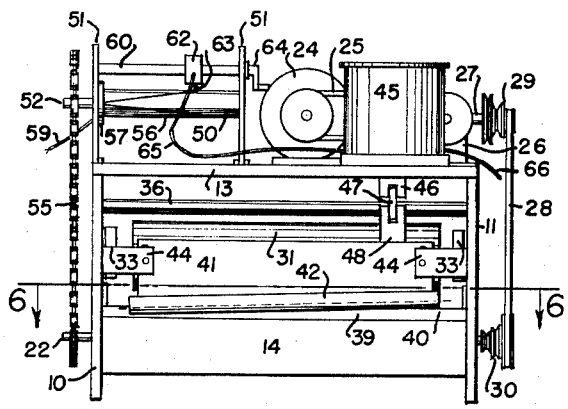
Figure 5 is an elevation of the delivery end of the unit shown by the preceding views.

Practical operation of the machine shown and described is positive, simple, and rather obvious from the foregoing. With a roll of the flexible material in place on the arms 15 and 16 and the web 35 thereof engaged about the rollers 31 and 36 and through the throat between the bed 37 and guard 38 as shown in Figure 3, operation of the motor 24 with the circuit including the solenoid 45 and switch organization powered functions to steadily rotate the feed roller 23 and the switch member 50 to alternately wipe the contact 63 across the dielectric surface of said member and an arc of the conducting sheath 56. When the contact 63 is engaged with the sheath 56, the solenoid is energized to lift the armature 46 and to consequently rock the yoke typified by the side bars 33 to lift the cutting edge of the blade 42 into clearing relation with the lip 40 and to press the bight of the web 35 about the roller 23 against the roller 31 with consequent advance of said web over and outwardly beyond the said lip below the blade 42, which feed of the web 35 continues during the full interval of sheath and contact engagement. When the contact 63 passes from the sheath to the non-conducting surface of the member 50, current flow to the solenoid is interrupted, the armature 56 is released, and the unbalanced weight of the yoke acts to drop the blade 42 across and with severing effect at the lip 40 upon the web 35 and to simultaneously lift the roller 31 for interruption of the web drive, thus cutting from the web in an interval of web rest a length of a longitudinal dimension determined by the duration of the web drive. Manifestly, shift of the block 62 and its contact 63 axially of the switch member 50 may be applied at any time to vary, regulate, and determine the interval of web drive and thereby determine the length dimension of the web sections successively severed by the machine.

Figures 8–13, inclusive, illustrate certain modifications, adaptations, supplements to and reorganizations of the essential elements of the unit as hereinabove described applicable to condition the unit for various specific operations and for use with various particular materials.

To satisfy the not infrequent requirement for uniform multi-layer lengths of the same or differing sheet materials, the unit may be arranged to feed such materials from a plurality of supply rolls as a single laminated web severable by the cutter blade as above described. An adaptation of the unit effective to feed and to cut into uniform lengths a double web of materials from separate rolls is expediently developed through replacement of the arms 15 and 16 by structurely similar and functionally identical, parallel arms 15' and 16' fixedly outstanding at an upward inclination from upper corners of the side plates 10 and 11 to receive and support the arbor 18 and roll 19 as above set forth save for a relatively elevated disposition thereof, and through the provision of supplementary similar arms 15" and 16" fixedly outstanding at a downward inclination from lower corners of said side plates coplanar with and spacedly beneath said arms 15' and 16' for the replaceable support of a second arbor 18' and a second roll 19' thereon disposed in spaced parallelism with the analogous elements 18 and 19. The webs 35 and 35' of the rolls 19 and 19' may be juxtaposed at and led as a double web over the roller 36 of the embodiment first described, or over the modified roller 36' hereinafter discussed, for feed by and between the rollers 23 and 31 and across the bed plate 37 and into position for severing by the cutter blade 42 in exactly the manner and with exactly the same effect previously set forth, thus to automatically accomplish successive uniform-length cuttings from the multi-layer web. Manifestly, appropriate mountings for additional rolls of materials may be provided in feeding association with the unit and for the feed thereto and therethrough of a loosely laminated web of any desired number and character of layers.

In an arrangement effective to slit and to thereby longitudinally divide single or multiple layer webs of sheet material as an incident of web feed to and through the unit, the idler roller 36 of the first embodiment is replaced by a roller 36' expediently journaled for free rotation in the arms 15' and 16' adjacent the junction of said arms with their respective side plates to span transversely of the unit in spaced parallelism with the roller 32. The roller 36' is formed with a succession of like circumferential grooves 67 in any preferred number and spacing longitudinally thereof and a shield 68 adapted to loosely and conformably overlie an upper arc of said roller forward in the direction of web travel is formed with transverse slots 69 disposed for registration with the grooves 67 of the subjacent roller. The shield 68 is supported in appropriate cooperating relation with and for limited, self-adjusting shift relative to the roller 36' by means of arms 70 fixedly outstanding at the ends of the shield and terminating in flanges 71 adapted to engage over margins of the arms 15' and 16' above the ends of the roller 36', and clips 72 detachably secured to the said upper margins of the arms 15' and 16' loosely overlap said flanges 71 to retain the latter in place with such freedom of flange movement as permits the shield to float slightly both radially and circumferentially of the associated roller. A bar 73 detachably secured to the side plates 10 and 11 in spaced parallelism with the roller 36' mounts a holder 74 for selective shift longitudinally thereof. The holder 74 extends radially from the bar 73 and toward the roller 36' to terminate in a free end adjacent the shield 68 worked to receive and to interchangeably support an elongataed blade 75, such as a safety razor blade, with its cutting edge presented through one of the slots 69 of said shield to engagement tangentially of the roller 36' within the groove 67 thereof registered with such slot; the length of the blade cutting edge being such as to dispose the blade ends outwardly of and in extension beyond the adjacent arcs of the roller. Thus, with the web or webs of sheet material from the supply roll or rolls trained over and downwardly about the roller 36' under the shield 68 to engagement with and for intermittent feed by the rollers 23 and 31 in the manner hereinabove described, the sheet material is drawn as an incident of its feed to and through the unit with a wedging action against the relatively inclined cutting edge of the blade 75 where said edge intersects the periphery of the roller by virtue of its accommodation in one of the grooves 67, thus to accomplish a longitudinal slitting and division of the material into widths determined by the setting of the blade with respect to the shield and associated roller. The shield 68 functions to yieldably urge the sheet material into smooth conformity with the arc of the roller 36' thereby engaged and to minimize any tendency of the material to buckle or wrinkle in reaction to engagement with the blade 75, thereby assuring smooth and uniform slitting of the material as the latter is advanced under the influences previoulsy set forth. Obviously, any desired number of holders 74 and associated blades 75 may be carried by the bar 73 in a selected spacing determined by their correlation with the grooves 67 effective to simultaneously divide the sheet material into multiple strips of preferred widths, addition of the holders to, or removal thereof from, the bar 73 and adjustment of the holders along said bar to desired correlation with the roller 36' being a simple manual operation requiring only detachment of the bar from the side plates 10 and 11.

Promotive of smooth, uniform advance of multi-layer and very thin webs of sheet material across the bed 37, a guard arranged for travel synchonously with the material may be substituted for the fixed guard 38 as represented in Figures 8, 9, 10 and 12. The traveling guard comprises an idler roller 76 journaled for free rotation in and spanning between the yoke side bars 33 parallel to the roller 31 and inwardly adjacent the sheer plate 41 with its lower arc spaced slightly above and to clear the adjacent bed 37 in all operative positions of the yoke wherein it is mounted, and a spaced succession of like endless bands or belts 77 engaged with, about, and extending between the rollers 31 and 76 in a consequent disposition of their lower reaches spacedly adjacent and across the plate 37 and perpendicular to said rollers at the lower arcs thereof. The roller 31 is preferably formed with shallow, annular grooves 78 receptive of the bands 77, whereby to minimize projection of the bands radially beyond the roller surface and to retain the bands against displacement axially of the rollers, and keepers 79 fixed to and outstanding from the shaft 34 may be disposed for loose engagement about the said bands to guide and retain the latter in the desired operative relationship thereof. The traveling guard functions whenever the yoke typified by the side bars 33 is oscillated to press the roller 31 and the sheet material therewith engaged against the feed roller 23, in which relationship of the elements the roller 31, bands 77, and roller 76 react in an obvious manner to the powered rotation of said roller 23 to advance the sheet material across the bed 37 and to synchronously and correspondningly advance the lower reaches of the said bands.

The springs 43 of the organization first discussed may be applied to enhance quick and positive cutting action of the blade 42, as well as to hold said blade in effective correlation with the lip 40, through the provision of fingers 80 fixedly outstanding perpendicularly from upper outer corners of the shear plate 41 and the arrangement of said springs to connect, under suitable tension, between the free ends of said fingers and points of the adjacent side walls 10 and 11 outwardly from and below said lip.

Maintenance of the blade 42 in effective cutting correlation with the lip 40 throughout the cooperating lengths of said elements is facilitated by a mounting of the blade on the shear plate 41 which accommodates adjustment at various points of the blade length to vary and to determine the coalignment of said blade and lip, and such a mounting is represented, particularly in Figures 10 and 13, as a heavy strip 81 of resilient material, such as rubber, between the lower side of the shear plate 41 and the upper margin of the blade 42 engageable therewith and a succession of closely-spaced bolts 82 through the blade upper margin and said strip 81 in threaded engagement at their inner ends with the shear plate area covered by said strip. The succession of bolts 82 extends the full length of the blade 42 and said bolts are individually manipulable with corresponding compression of the strip 81 to slightly flex the blade 42 at any given point and thereby vary and adjust the spacing of the blade relative to the shear plate for consequent effective alignment of the blade cutting edge with the lip 40.

Manifestly, the features peculiar to the embodiment according to Figures 8-13, inclusive, as above discussed, may be separately and individually utilized in the embodiment of the invention according to Figures 1-7, inclusive, as may be deemed to be expedient in adapting the unit to a particular use, or said features may be grouped and combined in any feasible manner to complete and operatively perfect a preferred operative embodiment of the invention, all such applications and combinations of the several disclosed features being within the contemplation of the invention.

Since changes, variations, and modifications in the form, construction, and arrangement of the elements shown and described may be had without departing from the spirit of our invention, we wish to be understood as being limited solely by the scope of the appended claims, rather than by any details of the illustrative showing and foregoing description.

We claim as our invention:

1. A machine of the character described, comprising powered feed means operable to advance a web of sheet material, a cutter reciprocable to transversely sever the web advanced by said feed means, means operatively engaged with and actuable by said cutter to interrupt the web-advancing action of said feed means during web-severing travel of the cutter and to automatically reestablish web-advancing action of the feed means upon return of the cutter away from severing relation with the web, cutter-actuating means in synchronously-driven relation with said feed means, and coacting elements in said cutter-actuating means relatively adjustable to selectively vary the operative cycle of the cutter for consequent determination of the duration of web-advance interruption controlled thereby.

2. A machine of the character described, comprising a feed roller powered for continuous, uniform rotation about its axis, a rigid yoke mounted for oscillation about an axis parallel to said feed roller, a pressure roller rotatably mounted in one end of said yoke parallel to said feed roller for tangential coaction with the latter at one limit of yoke oscillation to advance a web of sheet material engaged therebetween, a cutter mounted on the other end of said yoke parallel to said rollers reciprocable as an incident of yoke oscillation into and out of severing relation with the web advanced by said rollers, whereby web-cutting actuation of the cutter automatically separates the said rollers to interrupt web advance and return of the cutter away from severing relation with the web reestablishes web advance, cutter-actuating means in synchronously-driven relation with said feed roller, and coacting elements in said cutter-actuating means relatively adjustable to selectively vary the operative cycle of the cutter for consequent determination of the duration of web-advance interruption controlled thereby.

3. The organization according to claim 2, wherein a bed substantially tangential to said feed roller spacedly underlies said yoke for the slidable support of web material advanced by said roller, said bed terminates in a shearing lip parallel to the axis of yoke oscillation, and said cutter is constituted as a blade mounted in the superjacent end of the yoke for shearing coaction with said lip.

4. The organization according to claim 2, wherein a bed substantially tangential to said feed roller spacedly underlies said yoke for the slidable support of web material advanced by said roller, said bed terminates in a shearing lip parallel to the axis of yoke oscillation, the end of the yoke superjacent said lip mounts a blade coactable with said lip to rock on an axis parallel to the lip, said blade is spring-biased in its mounting to slidable engagement with the lip, and the free lower margin of said blade is inclined in a vertical plane transverse of the bed to maintain one end of the blade in engagement with the lip when the other end of the blade is elevated above the bed at that limit of yoke oscillation effective to dispose the pressure roller in web-advancing coaction with the feed roller.

5. The organization according to claim 2, wherein a fixed shearing lip parallel to the axis of yoke oscillation spacedly underlies the end of the yoke carrying the cutter, and the cutter is constituted as a shear plate mounted in the end of the yoke superjacent said lip to rock on an axis parallel to said lip through slight angular deviations from the plane common to said lip and the mounting axis of the plate, said plate is spring-biased to yieldably urge the plate lower margin toward the lip, a blade coactable with said lip is detachably engaged in overlying relation with the lower margin of said plate, the free lower margin of said blade being inclined in the plane of said plate to maintain one end of the blade in engagement with the lip when the other end of the blade is elevated above the lip at that limit of yoke oscillation effective to dispose the pressure roller in web-advancing coaction with the feed roller, a strip of resilient material separates overlapped areas of the shear plate and blade, and said blade is secured to the plate by a spaced succession of bolts threadedly engaging the plate through said blade and strip.

6. The organization according to claim 2, wherein the cutter-actuating means includes yoke imbalance and biasing springs yieldably urging the cutter to and through severing engagement with the web, a solenoid operatively linked to said yoke and energizable to rock the latter for elevation of the cutter against the influence of the yoke imbalance and biasing springs, and the relatively adjustable coacting elements of said means are constituted as a rotating switch controlling the circuit to said solenoid.

7. The organization according to claim 2, wherein the cutter-actuating means includes yoke imbalance and biasing springs yieldably urging the cutter to and through severing engagement with the web, a solenoid operatively linked to said yoke and energizable to rock the latter for elevation of the cutter against the influence of the yoke imbalance and biasing springs, a cylindrical member rotatable about its axis in synchronously-driven relation with the feed roller, complementary, tapered areas forming the cylindrical surface of said member, one of said areas being of dielectric material and the other of said areas being of conducting material, a contact member of conducting material selectively adjustable longitudinally of said cylindrical member in circumferentially-wiping engagement with the surface of the latter, and a circuit serving said solenoid through said contact member and that portion of the cylindrical member surface formed from conducting material.

8. The organization according to claim 2, wherein the cutter-actuating means includes yoke imbalance and biasing springs yieldably urging the cutter to and through severing engagement with the web, a solenoid operatively linked to said yoke and energizable to rock the latter for elevation of the cutter against the influence of the yoke imbalance and biasing springs, a cylindrical member rotatable about its axis in synchronously-driven relation with the feed roller, complementary, tapered areas forming the cylindrical surface of said member, one of said areas being of dielectric material and the other of said areas being of conducting material, a contact member of conducting material selectively adjustable longitudinally of said cylindrical member in circumferentially-wiping engagement with the surface of the latter, and a circuit serving said solenoid through said contact member and that portion of the cylindrical member surface formed from conducting material; together with manually-actuable means for shift of said contact member in either direction longitudinally of the cylindrical member.

9. The organization according to claim 2, wherein a bed substantially tangential to said feed roller spacedly underlies said yoke for the slidable support of web material advanced by said roller, an idler roller parallel to the pressure roller is mounted for free rotation in the yoke inwardly adjacent the cutter, and a spaced succession of endless bands engages about and between the pressure roller and said idler roller for travel of their lower reaches spacedly adjacent said bed in the direction of and synchronously with web advance over said bed.

10. The organization according to claim 2, wherein an idler roller parallel to the feed roller is mounted for free rotation about its axis for guiding and tensioning engagement by the material web prior to engagement of said web with the pressure and feed rollers, a spaced succession of circumferential grooves interrupts the cylindrical surface of said roller, and shiftable slitting elements coact with selected such grooves through the web area engaged over said roller.

11. The organization according to claim 2, wherein an idler roller parallel to the feed roller is mounted for free rotation about its axis for guiding and tensioning engagement by the material web prior to engagement of said web with the pressure and feed rollers, a spaced succession of circumferential grooves interrupts the cylindrical surface of said roller, an arcuate shield loosely and shiftably overlies the arc of said roller engaged by the web, transverse slots intersect said shield in registration with the subjacent grooves of said roller, and shiftable slitting elements coact with said grooves through the slots therewith registered.

12. The organization according to claim 2, wherein an idler roller parallel to the feed roller is mounted for free rotation about its axis for guiding and tensioning engagement by the material web prior to engagement of said web with the pressure and feed rollers, a spaced succession of circumferential grooves interrupts the cylindrical surface of said roller, an arcuate shield formed with transverse slots adapted to register with said grooves overlies the arc of said roller engaged by the web, arms at the ends of said shield support the latter for limited, self-adjusting shift radially, axially, and circumferentially of the associated roller, and selectively-shiftable slitting elements coact with said grooves through said sots and the web material between the roller and shield.

References Cited in the file of this patent

UNITED STATES PATENTS

| | | |
|---|---|---|
| 724,924 | McVicar et al. | Apr. 7, 1903 |
| 736,783 | Robinson et al. | Aug. 18, 1903 |
| 913,753 | Murray | Mar. 2, 1909 |
| 917,049 | Goldstein | Apr. 6, 1909 |
| 1,115,347 | Suggs | Oct. 27, 1914 |
| 1,211,185 | Leathem | Jan. 2, 1917 |
| 2,192,132 | Gautier | Feb. 27, 1940 |
| 2,223,767 | Lloyd | Dec. 3, 1940 |
| 2,310,153 | Rosenfarb | Feb. 2, 1943 |
| 2,386,652 | Borg | Oct. 9, 1945 |
| 2,447,103 | Susen | Aug. 17, 1948 |
| 2,693,235 | Kenworthy et al. | Nov. 2, 1954 |